United States Patent [19]
Hugoson

[11] 3,868,197
[45] Feb. 25, 1975

[54] SPACER RINGS FOR A GAS TURBINE ROTOR

[75] Inventor: Birger O. Hugoson, Wallingford, Pa.

[73] Assignee: Westinghouse Electric Corporation, Pittsburgh, Pa.

[22] Filed: Oct. 26, 1973

[21] Appl. No.: 410,131

[52] U.S. Cl. .......................... 415/199 R, 416/201
[51] Int. Cl. ...................... F01d 1/02, F01d 1/04
[58] Field of Search ....... 416/198, 198 A, 199, 200, 416/201, 186; 415/199 R, 219 R

[56] References Cited
UNITED STATES PATENTS
1,318,091  10/1919  Ljungstrom ........................ 416/201
2,796,836  6/1957  Bachi .............................. 416/186

FOREIGN PATENTS OR APPLICATIONS
394,001  6/1933  Great Britain ................. 416/198 A
571,205  8/1945  Great Britain ..................... 416/198
903,268  1/1945  France ............................. 416/198
849,329  9/1952  Germany ........................... 416/198

Primary Examiner—Henry F. Raduazo
Attorney, Agent, or Firm—G. H. Telfer

[57] ABSTRACT

A gas turbine or compressor having a spacer ring between adjacent rotor discs. The discs and rings have shrink fitted mating grooves and lips. The frictional engagement between those discs and rings increases as the centrifugal forces acting upon those members increases.

2 Claims, 2 Drawing Figures

PATENTED FEB 25 1975  3,868,197

SPACER RINGS FOR A GAS TURBINE ROTOR

BACKGROUND OF THE INVENTION

1. Field of the Invention

This invention relates generally to gas turbines or compressors, and more particularly to spacer rings disposed between and shrunk fit with adjacent rotor discs in a turbine or compressor.

2. Description of the Prior Art

Rotors for turbines and compressors are built in various ways. Two requirements however must always be met, which are; (a) the maintenance of shape and straightness of the components, and (b) the transmission of torque. The design of the rotor, blades, shaft, and associated components must also take into consideration stress allowances, environment, and manufacturing. Other considerations in turbo machine design are stiffness, lightness, and cost.

Spacer rings between adjacent rotor discs provide the alignment for the rotor. They also act in concert with the blade platform and the disc rings to define the inner portions of the elastic fluid flow path. The rings also transmit the torque effectively from disc to disc. Spacer rings provide for lightness in the structure of the turbine machine, which is important in airborne and seagoing applications. Certainly material cost and manufacturability are factors favoring spacer rings as opposed to solid rotors or discs or heavier means of joining discs together while still maintaining a uniform elastic fluid flow path. Stress considerations seem to favor spacer rings between rotor discs, and the rings are light because they provide a hollow cylindrical volume within their boundaries.

Bolt-on spacer rings are common in the art, they however, present the problems of windage loss, misalignment, and misassembly.

Spacer rings have been attached to rotor discs by brazing or welding. These methods raise difficulties with thermal expansion variations between the ring and the disc, and these methods of assembly also hamper the repair of these assemblies.

The objects of the present invention are to overcome these objections to the prior art.

BRIEF SUMMARY OF THE INVENTION

The present invention provides a simple yet effective structure for connecting adjacent rotor discs, transmitting torque between those discs, and locating the rotor discs axially, while helping to absorb the loading of the blades on the rotor periphery. This is accomplished by the employment of spacer rings between adjacent rotor discs. The rings have a circumferential outwardly directed groove on each edge that engages with, when shrunk fit upon, a circumferential radially inwardly directed lip on a flange extending off each side of the discs. Centrifugal forces cause a tigher engagement between the ring and the disc, thus eliminating problems of welding, bolting, and the like, associated with prior art devices.

BRIEF DESCRIPTION OF THE DRAWINGS

The invention, along with the objects and advantages thereof will be best understood from the following detailed description taken in connection with the accompanying drawings in which.

DESCRIPTION OF THE PREFERRED EMBODIMENTS

Figure 1:
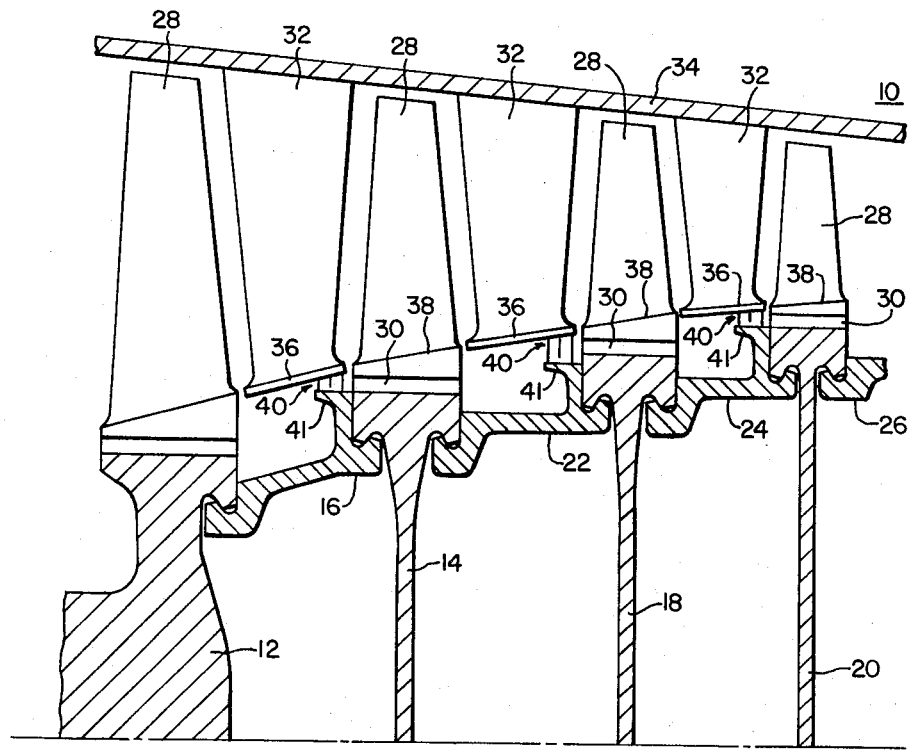
FIG. 1 is a side elevation, partly in cross-section, of a typical turbomachine rotor assembly utilizing the invention.

Referring to the drawings in detail, and particularly in FIG. 1, there is shown a portion of a turbomachine 10 having a first stage rotor disc 12, and a second stage disc 14, with a spacer ring 16 disposed therebetween. A succession of discs, 18 and 20, are shown having spacer rings 22, 24, and 26, between discs in succession.

Each disc, 12, 14, 18 and 20, has a plurality of radially directed blades 28 mounted in blade slots 30 on its periphery. Between each array of rotatable blades 28, are annular arrays of stationary blades 32. The radially outward portion of the blades 32 are supported by a blade ring 34. This blade ring 34 defines the radially outer boundaries of the elastic fluid flow path. The radially inwardly directed ends of the stationary blades 32 have a shroud ring 36, which define, along with a platform portion 38 on each of the rotatable blades 28, the radially inner boundaries of the elastic fluid flow path.

Labyrinthian seal strips 40 are disposed radially inwardly of the inner shrouds 36 to prevent elastic fluid from escaping the elastic fluid flow path. The labyrinthian seal strips 40 are in sealing contact with circumferentially disposed lip members 41 on the spacer rings 16, 22, 24 and 26. The labyrinthian seal members 40 work with the lip members 41 to prevent bowing of the rotors 14, 18 and 20 in case of rubbing of the seals 41 therewith.

Figure 2:
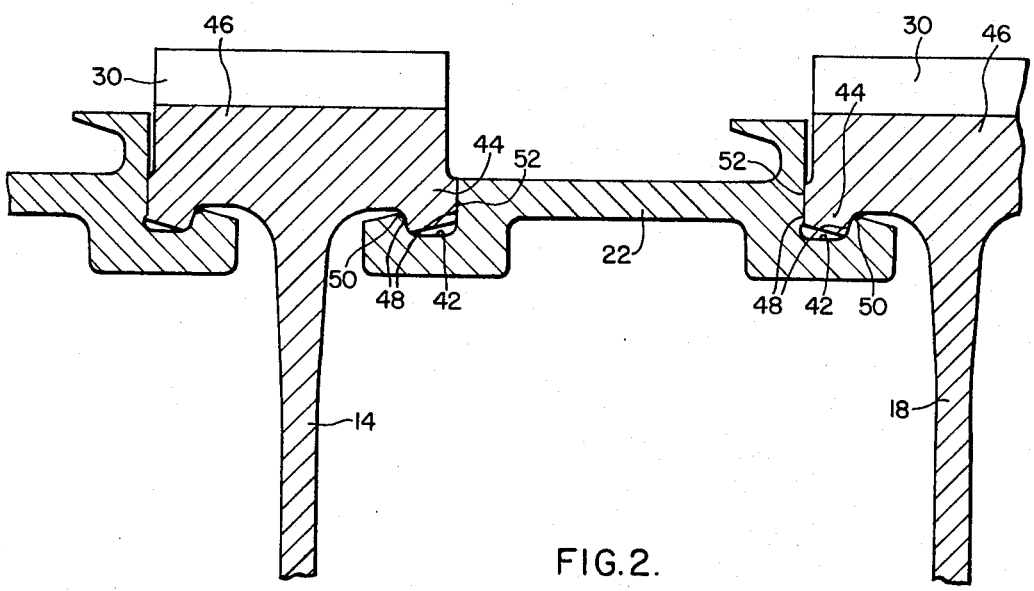
FIG. 2 is an enlarged side elevation, in cross-section, showing the invention in greater detail.

The spacer rings, 16, 22, 24 and 26, each have a circumferentially directed groove 42, as shown in FIG. 2. Each groove 42 mates with a circumferentially disposed radially inwardly directed lip member 44, that extends off each side of a flange 46 on each rotor disc periphery.

The assembly and engagement of the rotor discs 12, 14, 18 and 20, and the spacer rings 16, 22, 24 and 26, includes: cooling the spacer rings 16, 22, 24 and 26, to about −300°F. The cold bath is preferably comprised of liquid nitrogen. The discs 12, 14, 18 and 20, are simultaneously heated to a temperature of about +700°F. Each of the discs and the spacer rings are alternately disposed about the turbomachine axis (not shown), and mated with one another. The lips 44 engage the grooves 42. When ambient temperature of the member is reached, the spacer rings 16, 22, 24, and 26, will have expanded slightly, and the discs 12, 14, 18 and 20, will have contracted slightly. This change in dimensions will cause the mating and the interlocking engagement between the spacer rings 16, 22, 24 and 26, and the discs 12, 14, 18 and 20. During turbomachine 10 operation, the temperature of these members will be approximately the same, so they will maintain their interlocking engagement. In addition, during rotation of these members, the centrifugal forces within the spacer rings 16, 22, 24 and 26 will cause slight expansion which will create a still tighter engagement between the discs 12, 14, 18 and 20 and the spacer rings 16, 22, 24 and 26.

Each groove 42 and each lip 44 may have oblique surfaces 48 to produce a wedging action and further increase the grip between adjacent members.

An alternative embodiment of the spacer rings 14, 22, 24 and 26, comprises the use of serrations or knurled edges 50, as shown in FIG. 2, to increase the grip and transmissability of the torque between adjacent disc and spacer ring members.

Each spacer ring, 16, 22, 24 and 26, and each flange member 46, have control surfaces 52, as shown in FIG. 2, which must be planar, and parallel with one another to insure an even fit and straightness between the members.

Though the invention has been described with a certain degree of particularity, changes may be made therein without departing from the scope and spirit thereof. For example, the invention has been described using only four discs and four spacer rings. It is apparent from the disclosure that more or less discs or rings may be used, and also that a disc may have a spacer ring disposed on only one side thereof, as for example a disc on each end of an axis of the turbomachine. Similarly, the spacer rings may be used without labyrinthian seals, and they may themselves comprise a portion of the radially inner boundary of the elastic fluid flow path. Also the engagement of the groove and lip may include many alternative modifications.

I claim:

1. A spacer ring structure for a multi-stage turbomachine comprising an outer casing, at least two axially spaced-apart rotor discs, an annular array of radially directed rotor blades spaced on the periphery of each rotor disc, at least one annular array of stationary blades disposed between the arrays of the blades on the rotor periphery, each rotor having an axially directed flange member extending off at least one side thereof toward the adjacent disc, and at least one spacer ring shrunk fit into frictional engagement with and disposed between adjacent rotor discs, each of said axially extending flanges having a radially inwardly extending circumferential lip on their edges, each of said spacer rings having a radially outwardly directed circumferential groove on each edge, said radially outwardly directed circumferential groove on said spacer ring being in constricting frictional engagement with said radially inwardly directed circumferential lips on said flanges of said rotor discs, said shrunk fit spacer ring having an array of serrations on its outwardly extending groove to frictionally engage a portion of said flange adjacent said lip on said rotor disc.

2. A spacer ring structure as recited in claim 1 wherein the side walls of said lips and the side walls of said grooves are generally obliquely inclined to provide a wedging action between the mating surfaces, due to centrifugal forces generated therein during machine operation.

* * * * *